(12) United States Patent
Perron et al.

(10) Patent No.: US 8,482,725 B2
(45) Date of Patent: Jul. 9, 2013

(54) METHOD AND APPARATUS FOR IDENTIFICATION OF MULTIPLE FIBERS USING AN OTDR

(75) Inventors: Stéphane Perron, Sainte Hélène-de-Breakeyville (CA); Bernard Ruchet, Quebec (CA); Michel Leblanc, Quebec (CA)

(73) Assignee: Exfo Inc., Quebec (CA)

( * ) Notice: Subject to any disclaimer, the term of this patent is extended or adjusted under 35 U.S.C. 154(b) by 1102 days.

(21) Appl. No.: 12/081,985

(22) Filed: Apr. 24, 2008

(65) Prior Publication Data

US 2009/0268197 A1    Oct. 29, 2009

Related U.S. Application Data

(63) Continuation of application No. PCT/CA2006/001732, filed on Oct. 24, 2006.

(60) Provisional application No. 60/729,237, filed on Oct. 24, 2005.

(51) Int. Cl.
*G01N 21/00* (2006.01)

(52) U.S. Cl.
USPC .......................................................... 356/73.1

(58) Field of Classification Search
None
See application file for complete search history.

(56) References Cited

U.S. PATENT DOCUMENTS

| 5,013,908 | A  | * | 5/1991  | Chang ...................... 250/227.15 |
|-----------|----|---|---------|---------------------------------------|
| 5,202,746 | A  | * | 4/1993  | Sentsui et al. ............... 356/73.1 |
| 5,321,541 | A  |   | 6/1994  | Cohen                                 |
| 5,506,674 | A  |   | 4/1996  | Inoue et al.                          |
| 6,269,204 | B1 | * | 7/2001  | Ishikawa ......................... 385/24 |
| 6,396,575 | B1 |   | 5/2002  | Holland                               |
| 7,808,621 | B2 | * | 10/2010 | Russell ....................... 356/73.1 |
| 2003/0012514 | A1 |   | 1/2003  | LaGasse                            |
| 2005/0146711 | A1 |   | 7/2005  | Suino                              |
| 2008/0297773 | A1 |   | 12/2008 | Blair et al.                       |

FOREIGN PATENT DOCUMENTS

JP             07023002 A    *   1/1995

OTHER PUBLICATIONS

U.S. Appl. No. 11/495,398, filed Feb. 1, 2007, Russell.

* cited by examiner

*Primary Examiner* — Gordon Stock, Jr.
(74) *Attorney, Agent, or Firm* — Thomas Adams

(57) ABSTRACT

In order to simplify and expedite identification of fibers (DF1/1, . . . , DF2/4) in multi-fiber cables (DF1, DF2), a method of identifying each of a plurality of fibers includes the steps of launching light into each of the fibers using an OTDR and applying a unique signature to each resulting OTDR trace by means of an event feature box comprising signature-applying means (EB) connected to a distal end of the fibers. The resulting plurality of OTDR traces have different signatures, enabling identification of each of the fibers by detecting its signature in the corresponding OTDR trace.

27 Claims, 7 Drawing Sheets

METHOD AND APPARATUS FOR IDENTIFICATION OF MULTIPLE FIBERS USING AN OTDR

CROSS-REFERENCE TO RELATED APPLICATION AND DOCUMENTS

This application is a Continuation of international patent application number PCT/CA2006/001732 filed Oct. 24, 2006 which designated the United States of America and claimed priority from U.S. Provisional patent application No. 60/729,237 filed Oct. 24, 2005. The entire contents of these two applications are incorporated herein by reference.

The present application is related to Disclosure Document No. 583369 entitled "Improved Multi-Fiber Receive Box for OTDR Testing", filed in the United States Patent and Trademark Office on Aug. 4, 2005, and to Disclosure Document No. 584846 entitled "Improved Multi-Fiber Receive Box for OTDR—Application", filed in the United States Patent and Trademark Office on Aug. 29, 2005. The entire contents of these documents are incorporated herein by reference.

TECHNICAL FIELD

The invention relates to a method of and apparatus for identifying each of a plurality of optical fibers by means of an optical time domain reflectometer (OTDR).

BACKGROUND ART

Optical Time Domain Reflectometers (OTDRs) are commonly used to characterize an optical fiber. Their use permits single-ended measurements that allow measurements to be undertaken with only one field technician, thereby reducing the expense associated with additional testing personnel. Typically an OTDR can provide total loss, length and return loss of a fiber, as well as localize loss and reflectance at each joint (splice or connector). In order to characterize the input and output connectors of a fiber optic link, it is usual to add a proper lead-in ("launch") fiber and a termination fiber (sometimes referred to as a "receive" fiber) in order to provide a reference backscattering level before and after each connector. This method is well known by the users of OTDR.

It is frequently required, such as in a Fiber-To-The-Home (FTTH) passive optical network (PON), to test a cable that contains many fibers and to ensure that, at the distal end of the cable under test, the constituent fibers are correctly identified for subsequent connection to a patch panel or fiber distribution hub (FDH). The fiber distribution hub normally comprises at least one 1×N (where N is frequently equal to 32) passive splitter, to which N different fibers may be attached. The cable-under-test generally comprises a subset (e.g. 4) of these N different fibers and terminates at a terminal drop box (DB), from whence the OTDR measurement is launched.

It is known, when testing a cable that contains many fibers, to connect the OTDR to each fiber-under-test (FUT) in turn using a single launch fiber, while the distal end of each of the fibers-under-test (FUTs) remains connected to the FDH or patch panel. However, this approach is not always feasible in an active (i.e. operational/in service) passive optical network (PON), since the launched OTDR light may interfere with system operation.

An alternative known approach, when testing a cable that contains many fibers, is to connect the OTDR to each fiber-under-test (FUT) in turn using a single launch fiber, while the distal end of each of the fibers-under-test (FUTs) is connected to a respective one of a series of termination fibers. While a single launch fiber will usually suffice because the user can easily move it from one fiber input to each of the others, it is preferable to use a series of termination fibers because it obviates the need for the user to go to the FDH and back to the terminal drop box, between measurements, to move the termination fiber from the distal end of one FUT to the next.

It is often desirable to be able to determine which termination fiber is detected on the OTDR trace. The mapping between the ends of the FUTs and the termination fibers allows determination of which distal fiber end corresponds to a given input fiber. This feature is very useful since it can detect errors in fiber marking and cable deployment.

One approach is to use a multi-fiber receive box wherein each of the termination fibers is of a different length, this difference in length being sufficiently large so as to be readily resolvable by the OTDR. The reflection from the end of each termination fiber, whether arising from the approximately 4% Fresnel reflection at a perpendicularly-cleaved glass-air interface or from some explicit reflective element (e.g. end minor, broadband Bragg reflector, etc.), yields a clearly visible peak on the OTDR trace. Hence, when testing with an OTDR, the length of the termination fiber can in principle be determined, thereby allowing determination of which termination fiber (R1 to R4) is present.

A limitation of this technique is that, when the connector between the fiber end and the receive box has a very low reflectance and loss, such is generally the case when an APC (Angled Physical Contact) type of connector is used, the reflectance of such connectors, when mated, is often negligibly small and, hence, undetectable with an OTDR. The detection of a reflectance "event" at the distal end of the FUT, yielding a peak on the OTDR trace, provides an important reference point for calculating the end of the termination fiber. If the connection between the fiber end and the termination fiber box cannot be detected, the length of the termination fiber often cannot be reliably determined, which makes it very difficult to verify that the fiber end is properly mapped, as well as rendering the FUT loss measurement less precise.

SUMMARY OF THE INVENTION

The present invention seeks to eliminate, or at least mitigate, the disadvantages of the prior art discussed above, or at least provide an alternative. To this end, embodiments of the present invention apply to each OTDR trace a unique signature enabling identification of each fiber by detecting its signature in the corresponding trace.

According to one aspect of the present invention, there is provided a method of using an optical time domain reflectometer (OTDR) and signature-applying means (EB) to identify each of a plurality of fibers each having first and second ends, the signature-applying means comprising a plurality of input ports (IP1, . . . , IP4) for connection to the plurality of fibers (DF1, . . . , DF4), respectively, and a plurality of event feature means (E1', . . . E4'; E1", . . . , E4") connected to said plurality of input ports for producing in OTDR traces for fibers connected to said input ports, respectively, a corresponding plurality of unique signatures, each unique signature comprising at least two events (4, 5), said at least two events being distinguishable from any event (3) in that OTDR trace attributable to the corresponding input port,
one of said at least two events comprising a reference event (5) that is a predetermined reference effective optical distance from its corresponding input port, said reference effective optical distance being substantially the same for all of the plurality of signatures, the method comprising the steps of:
connecting the second end of each of the plurality of fibers (DF1, ..., DF4) to a respective one of said plurality of input ports (IP1, ..., IP4) of the signature-applying means (EB); using the OTDR, launching light into the first end of each of the fibers and obtaining at least one OTDR trace for each fiber comprising a respective unique signature including said reference event, and
identifying each of the fibers by detecting the said at least two events of the respective unique signature.

In preferred embodiments, each signature comprises an OTDR trace event caused by a physical phenomenon or combination of phenomena along the fiber.

Thus, in the context of this specification, an OTDR backscatter trace "event" is a change in the backscatter signal as a function of distance along the fiber caused by any physical phenomenon or combination of physical phenomena, such as reflection or attenuation, including wavelength dependence thereof, preferably localized within the spatial resolution of the OTDR. The said physical phenomenon or phenomena causing such "event" in the OTDR trace will be referred to herein as an "event feature".

Each of the signatures may be identified with the respective one of the said plurality of fibers by generating at least two backscatter events spaced apart from each other by a predetermined effective optical distance that is different from the predetermined distance between the at least two backscatter events of other signatures.

Alternatively, each of the signatures may be applied to the respective one of the said traces by amplitude modulation of at least one event, such that the event amplitude differs from one fiber signature to another.

The amplitude modulation may be provided by an event feature producing a predetermined change in value of a loss (or attenuation), a gain, or a reflectance.

According to a second aspect of the present invention, there is provided signature-applying means (EB) for use with an optical time domain reflectometer (OTDR) in identifying each of a plurality of fibers (DF1/1, ..., DF2/4), the OTDR being connected in use to respective first ends of the plurality of fibers for launching light into said first end of each of the fibers in turn and obtaining at least one corresponding OTDR trace therefrom,
said signature-applying means (EB) having a plurality of input ports (IP1, ..., IP4) for connection to respective second ends of the fibers, and a plurality of event feature means for producing in OTDR traces a corresponding plurality of unique signatures, each signature comprising at least two events distinct from any event generated by a respective one of said input ports, each of the said at least two events being detectable by at least one of its position, its amplitude, and a wavelength at which it is detected, each of the fibers being identifiable by detecting the said at least two events of the respective unique signature in the at least one OTDR trace corresponding to said respective signature-applying means,
each event feature means comprising a reference event feature at a predetermined reference effective optical distance from the corresponding input port for producing a corresponding reference event in a corresponding signature.

According to a third aspect of the present invention, there is provided a method of using an optical time domain reflectometer (OTDR) and signature-applying means (EB) to identify each of a plurality of fibers each having first and second ends, the signature-applying means comprising a plurality of input ports (IP1, ..., IP4) for connection to the plurality of fibers (DF1, ..., DF4), respectively, and event feature means (E1', ... E4'; E1", ..., E4") connected to said plurality of input ports for producing in OTDR traces for fibers connected to said input ports, respectively, a corresponding plurality of unique signatures,
said signature-applying means further comprising a plurality of additional ports (OP1, ..., OP4) each in optical continuity with and a known effective optical distance from a respective one of said plurality of input ports,
the method comprising the steps of:
(i) validating a quality of a connection between at least one of the plurality of input ports and a respective fiber connected thereto, the quality validation comprising launching light into a corresponding one of said additional ports by means of an OTDR connected locally thereto, obtaining a validation OTDR trace from this additional port and determining said quality from said validation OTDR trace;
(ii) connecting a second end of each of the plurality of fibers (DF1, ..., DF4) to a respective one of said plurality of input ports (IP1, ..., IP4) of the signature-applying means (EB);
(iii) using an OTDR, launching light into a first end of each of the fibers and obtaining at least one OTDR trace for each fiber comprising a respective unique signature and identifying said fiber therefrom.

According to a fourth aspect of the present invention there is provided signature-applying means for use with an optical time domain reflectometer (OTDR) to identify each of a plurality of fibers, the signature-applying means (EB) comprising a plurality of input ports (IP1, ..., IP4), a plurality of additional ports each connected to a respective one of the input ports, and a plurality of event feature means each connected to a respective one of said input ports, each event feature means producing in OTDR traces of a fiber connected to a corresponding one of said input ports a respective one of a plurality of unique signatures, each signature comprising at least two events in the corresponding OTDR trace, one of said two events being generated by a respective open one of said additional ports.

In embodiments of the foregoing aspects of the invention, the signature-applying means may be arranged to generate the said signature for each of the said plurality of fibers by generating at least two backscatter events spaced apart from each other by a predefined effective optical distance that is different from corresponding predefined effective optical distances between corresponding at least two backscatter events of the signatures of others of said traces.

Alternatively, the signature-applying means may generate the said signature for each of the said plurality of fibers by amplitude modulation of one or more backscatter events, such that the event amplitude differs from one fiber signature to another. The signature-applying means may comprise means for providing a predetermined value of a loss or attenuation to effect amplitude modulation of said one or more of the backscatter events.

For example, an event may be generated by one or more elements such as a single reflector, a mirror surface of a splitter/coupler, a single reflective Bragg grating or a single attenuator. Alternatively, it may comprise a combination of such elements, for example a splitter where one of the arms is terminated with a reflective surface at a short distance from the splitter, the splitter providing attenuation and the mirror providing the reflectance. Another combination might comprise two closely-spaced pairs of mating connectors, e.g., at respective ends of patch cords connecting the signature-applying means to a patch panel and the patch panel to each of the fibers under test (FUTs).

This enables the user to identify in each trace the portion corresponding to the location of the connection between the fiber-to-be-identified (FUT) and the signature-applying means, which might otherwise be difficult or impossible if the connector exhibits very low loss.

Preferably, each of the plurality of signature means at the predetermined spacing comprises a monitoring port which, when left open, generates a reflective said event in the corresponding OTDR trace signature. The monitoring port may be adapted for connection to an OTDR for launching light into the monitoring port and analyzing backscatter from the connection to the FUT to determine the quality of such connection.

Combination of embodiments of the invention allows the signatures to be identified by spacing and/or characteristics.

When testing optical fibers in cables in passive optical networks, for example, using an OTDR and a termination fiber at the other end of the FUT, it is desirable to be able to check the connection between the particular FUT and the termination fiber before a test technician travels to the opposite end of the FUT where the OTDR will be connected to initiate reflectometric testing.

Accordingly, signature-applying means according to the third aspect of the present invention may further comprise a plurality of input ports for connection to respective ones of the plurality of fibers and a plurality of additional ("monitoring" or "output") ports connected internally to the input ports, the additional ports being adapted for connection to an OTDR to allow characterization of the connections between the input ports and the fibers.

The foregoing and other objects, features, aspects and advantages of the present invention will become more apparent from the following detailed description, in conjunction with the accompanying drawings, of preferred embodiments of the invention which are described by way of example only.

DESCRIPTION OF THE PREFERRED EMBODIMENTS

Figure 1A:
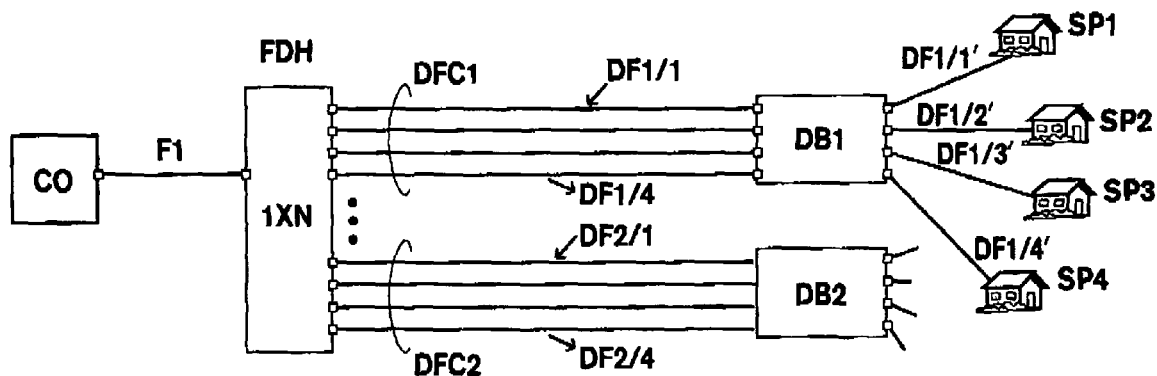
FIG. 1(a), labeled PRIOR ART, is a simplified schematic diagram illustrating a typical portion of passive optical network connecting a central office to a group of subscribers by way of a fiber distribution hub (FDH) and several terminal drop boxes.

Referring to FIG. 1(a), in a typical passive optical network a central office CO is connected by a trunk cable F1 to a fiber distribution hub (FDH). Within the FDH, at least one 1×N coupler (not shown) connects the trunk fibers to several distribution fiber cables. Two distribution fiber cables DFC1 and DFC2 are shown, each comprising, for example, four fibers and connected to terminal drop boxes DB1 and DB2, respectively. There may be many more terminal drop boxes, but only two are shown so as to simplify the description. Also, although two distribution cables and associated drop boxes are shown, only the testing of one cable, DFC1, will be described, it being understood that the same description applies to both.

Terminal drop box DB1 connects its four distribution fibers DF1/1-DF1/4 to four drop fibers DF1/1' to DF1/4' which connect to the subscriber premises SP1 to SP4, respectively. Terminal drop box DB2 is connected in a similar manner to another four subscriber premises.

During installation, and possibly afterwards, a technician will need to check the quality of the various connections between the concatenated fibers connecting a particular drop fiber to the FDH. This may be achieved by making a series of OTDR measurements from the ends of the distribution fibers DF1/1 to DF1/4 closest to the FDH.

A limitation of this approach is that, if the fibers are wrongly connected at the terminal drop box (DB1) on account of a misidentification of the fibers at either end of the distribution fiber cable (DFC1), it is not generally possible to detect this with the OTDR measurements alone. Frequently this incorrect connection would only be detected after system turn-on, when correcting the problem might be costly in terms of technician labor and time.

Figure 1B:
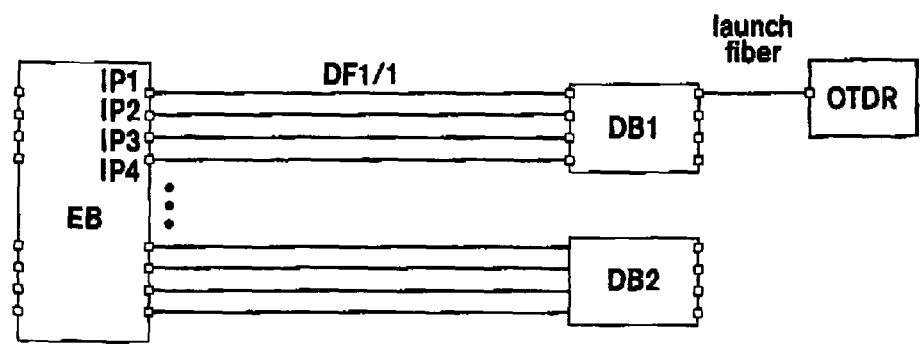
FIG. 1(b) illustrates connection of an event signature-applying unit (EB) embodying the present invention to the drop boxes of a passive optical network.
Figure 2:
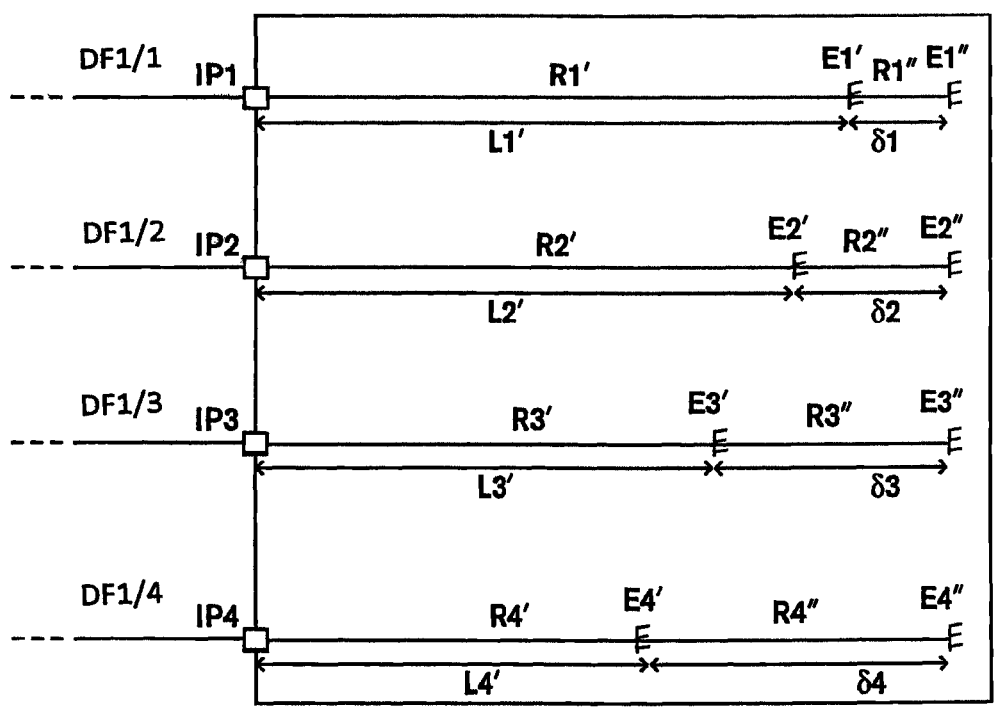
FIG. 2 is a simplified schematic diagram of an event signature-applying unit embodying the present invention in which each input port is coupled to two mutually-spaced event features.

Preferred embodiments of the present invention address this limitation by attaching event signature-applying means in the form of an event signature-applying unit or event feature box EB, to the end of the FUT remote from the OTDR, as shown in FIG. 1(b). As shown in FIG. 2, within the event feature box EB are several event signature-applying means or event features, each for applying a unique signature to the OTDR trace for each FUT. Input ports IP1 to IP4 of the event feature box EB are connected to distribution fibers DF1/1 to DF1/4, respectively. A first event feature E1' is provided at the junction between two termination fiber sections R1' and R1" and a second event feature E1" is connected to the distal end of termination fiber section R1". The length of termination fiber section R1' is L1' and the distance between the pair of event features E1' and E1" is shown as $\delta 1$.

Ports IP2 to IP4 are connected in a similar manner to the pairs of event features E2', E2", E3', E3" and E4', E4" by termination fiber sections R2', R2", R3', R3" and R4', R4", respectively. The distances between the pairs of event features E2', E2", E3', E3" and E4', E4" are $\delta 2$, $\delta 3$ and $\delta 4$, respectively.

The distances between the input ports IP1 to IP4 and the furthermost features E1" to E4", respectively, are equal to each other. The distances L1' to L4', however, differ so that spacings $\delta 1$, $\delta 2$, $\delta 3$ and $\delta 4$ between respective pairs of events are not equal to each other. Consequently, during subsequent OTDR measurements of the four distribution fibers DF1/1 to DF1/4, while attached to input ports IP1 to IP4, respectively, the spacing between event pairs will allow the user to determine which of the distribution fibers DF1/1 to DF1/4 is connected to which of the input ports IP1 to IP4.

Once the event feature box EB, which includes the event features, has been installed and the connections made, the technician will carry out the measurements from the terminal drop box DB1 or from each of the subscriber premises SP1 to SP4, if they have been connected. An advantage of taking measurements from the subscriber premises is that each measurement is a true "end-to-end" measurement between each of SP1 to SP4 and the FDH. A disadvantage is that the technician must move between each subscriber premises for each measurement. In the case of a new FTTH deployment in a neighborhood, individual subscriber premises are often not yet connected (e.g. the drop lines are not installed), and the measurements will be carried out from the terminal drop box DB1. Herein, we describe measurements carried out from the drop box DB1, but the description can readily be extended to include measurements taken from the subscriber premises.

If measuring at the terminal drop box DB1, the technician will disconnect the ends of the distribution fibers DF1/1 to DF1/4 from the drop fibers DF1/1' to DF1/4', connect them instead, in turn, to the OTDR by means of the usual lead-in or launch fiber, and obtain an OTDR trace for each of the four distribution fibers DF1/1 to DF1/4, in known manner, i.e., by launching pulsed light into each fiber and capturing and temporally analyzing the backscattered light.

Figure 6A:
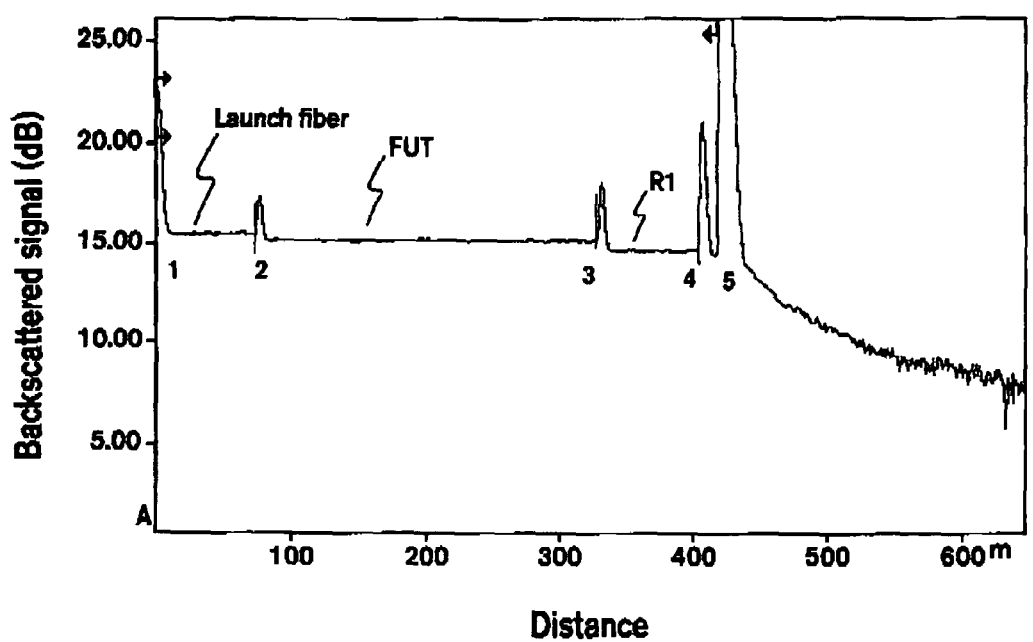
FIGS. 6(a) to 6(c) illustrate traces obtained using an OTDR and an event signature-applying unit embodying this invention.

As illustrated in FIG. 6(a) for the case where fiber DF1/1 is correctly connected to input port IP1 of the event feature box EB, each OTDR trace will show a series of events, the first 1 corresponding to the connection between the OTDR and the launch fiber, the second 2 corresponding to the connection between the launch fiber and the FUT, the third 3 corresponding to the connection between the FUT and the input port IP1, the fourth 4 corresponding to the closer event feature E1' and the fifth 5 corresponding to the furthermost event feature E1". The portion of the trace including the events corresponding to the event features of the event feature box EB is shown to an expanded distance scale in FIG. 6(b). It should be noted that, as discussed earlier, the third event may not be visible if APC-type connectors are used for mating the FUT to the input port IP1.

Figure 6B:
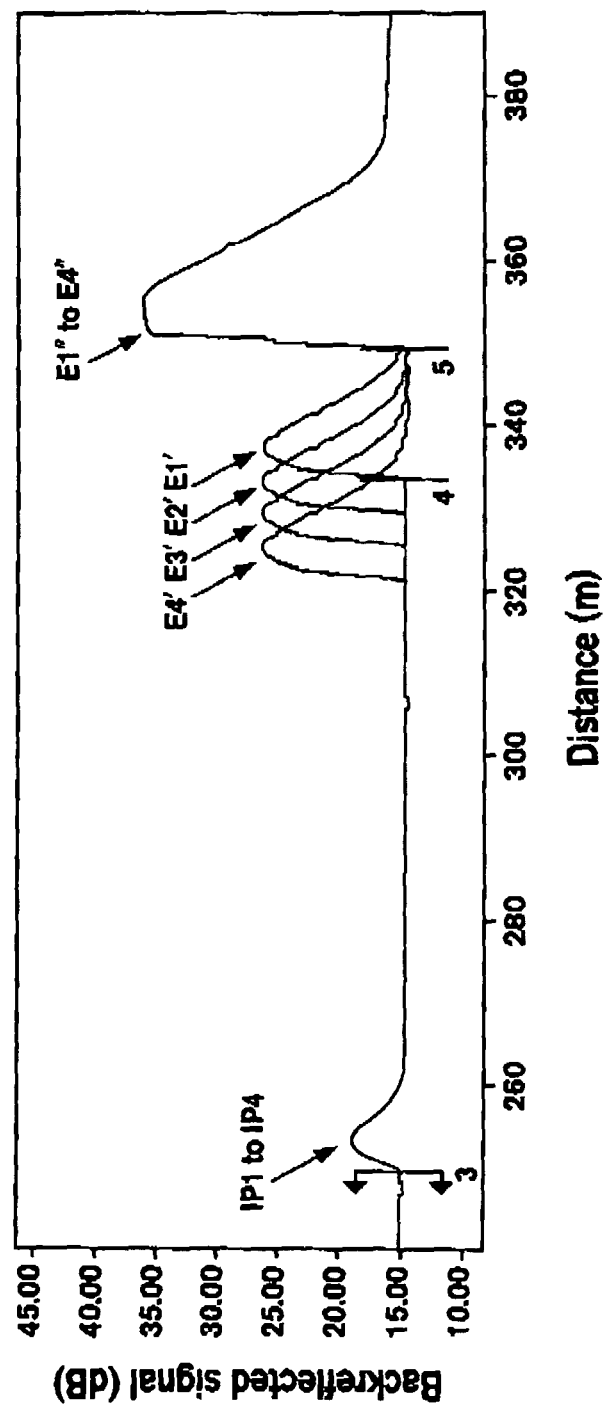

FIG. 6(b) shows the locations of events corresponding to event features E2', E3' and E4' which would be generated if the fiber were connected to input ports IP1, IP2 and IP3, respectively. In each trace, the event 5, representing a respective one of event features E1"-E4", is at the same predefined reference effective optical distance from the respective input port regardless of the input port to which the fiber is connected, and constitutes a reference event in each OTDR trace. Hence, the difference in spacing between the five events 1 to 5 and in particular the difference between fourth event 4 corresponding to the respective one of event features E1', E2', E3' and E4' and the fifth event 5 corresponding to the respective one of furthermost (reference) event features E1", E2", E3", E4", allows the user to identify the input ports on the signature-applying means EB to which the fibers DF1/1 to DF1/4 are connected. Following this identification, the technician may go on to perform various other analyses of the OTDR measurements, or undertake new measurements on the same fibers, in known manner.

It should be noted that it is often the case that, in normal operation of a PON, the fibers comprising the distribution cables DFC1, DFC2 are not connected directly to the FDH but rather are connected to a patch panel (not shown) from which jumper cables connect them to the FDH. However, the length of these jumper cables is generally sufficiently short (typically 1-2 m) that, when connected so as to join the plurality of ports of the FDH with the corresponding plurality of ports of the patch panel, their connections effectively constitute only one event feature producing only one detectable event.

Once the various measurements have been made, the technician will restore the connections at the terminal drop box DB1, return to the FDH location, remove the event feature box EB and restore the connections between the properly identified distribution fibers and the FDH. If desired, the process can be repeated for other groups of fibers and terminal drop boxes.

An advantage of this procedure is that it can be carried out by one person, whereas known techniques usually require two people.

After installing the signature-applying means in the form of event feature box EB, the user usually will take steps to ensure that the connections between the distribution fibers and the input ports of the signature-applying means are satisfactory, i.e., not unduly lossy, before traveling to the terminal drop box, which might be several kilometers away. Hence, it is desirable to check the connections by making a loss measurement. This can be achieved by providing the signature-applying means EB with a plurality of additional ports enabling an OTDR to be used to measure loss at each of the input connectors.

Figure 3:
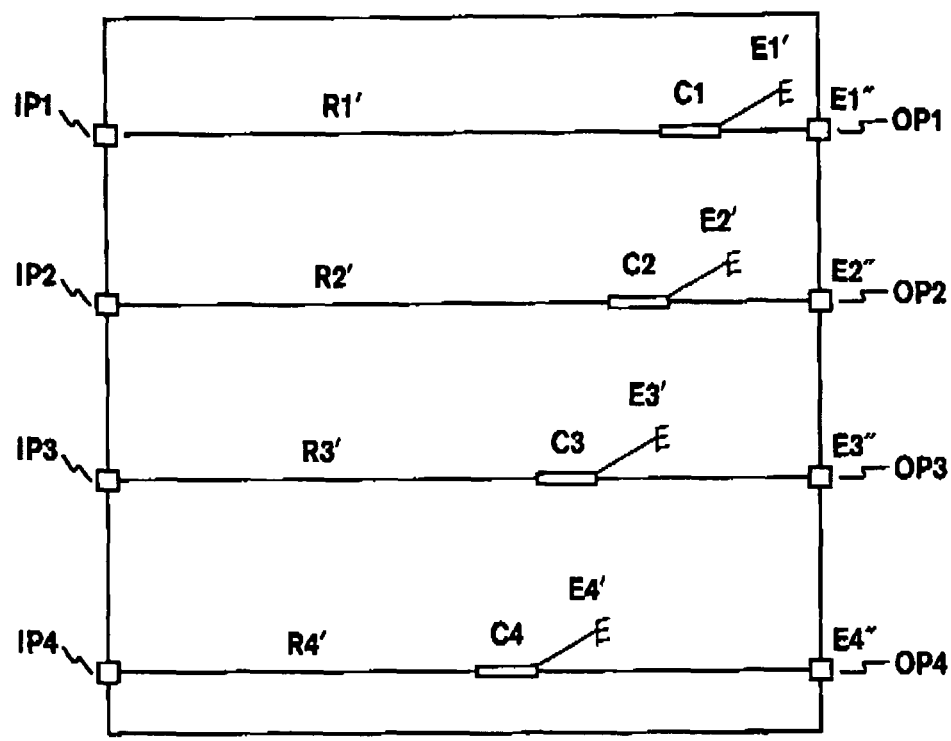
FIG. 3 illustrates an event signature-applying unit in which some of the event features comprise additional ports and others comprise branching devices.

Such an arrangement is illustrated in FIG. 3, which shows signature-applying means EB similar to that shown in FIG. 2, but in which the first event features E1' to E4' are shown to be provided by branch couplers C1 to C4 having their respective inputs connected to respective ends of the termination fiber sections R1' to R4', respectively. The branch couplers each have a reflector at one of their output ports, e.g., a mirror surface of the output port, at an optical distance from the branch coupler less than the spatial resolution of the OTDR. Second outputs of the four branch couplers C1 to C4 are connected to additional ports OP1 to OP4, respectively. The minor surfaces, in combination with the respective coupling losses of the respective branch couplers, constitute the first set of event features E1' to E4'. The additional ports, when left open, constitute the second set of event features E1" to E4", respectively. It should be noted that the first set of events are created by a combination of reflectance and attenuation.

It should also be noted that it is not essential for the minor to be at a distance from the branching coupler that is less than the OTDR resolution. It could be further away, and this would then produce two distinct events: an attenuation event due to the coupler and a reflection event due to the minor.

In addition, the additional ports OP1 to OP4 may be connected to an OTDR, conveniently the same one that will be used subsequently at the terminal drop box location for identifying the ports of the signature-applying means EB and characterizing the fibers and connections. In this case, however, the OTDR is used to launch light into each of the distribution fibers DF1/1 to DF1/4 by way of the corresponding path formed by the respective one of the additional ports OP1 to OP4, the input ports IP1 to IP4, the intervening termination fiber, and the corresponding one of the connectors connecting the fibers to the input ports. It should be noted that no events are caused by the mirrors E1' to E4' when the light is launched "backwards" into the signature-applying means EB. As well, depending upon the splitting ratio of the respective one of the branch couplers C1 to C4, the attenuation loss of the coupler alone may or may not produce a significant event on the respective OTDR trace. Because the distance from each of the additional ports OP1 to OP4 to the corresponding one of input ports IP1 to IP4 is the same, and known, the user can check the quality of the connections to the distribution fibers and remake them if necessary. This can avoid the user having to travel to and fro between the FDH and the drop box to fix bad connections which otherwise would only become apparent when making the measurements at the terminal drop box.

Figure 6C:
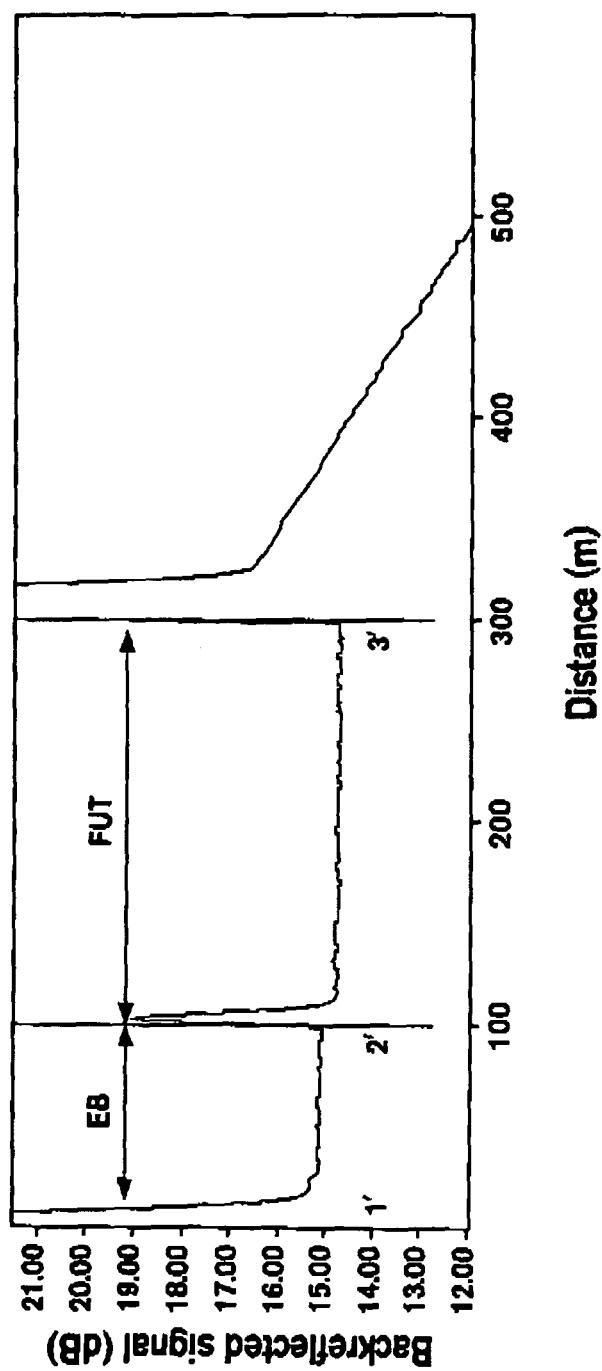

FIG. 6(c) shows a trace that may be seen when using this arrangement, whereby the OTDR light is launched into a respective one of the additional ports OP1 to OP4. Event 2' corresponds to residual reflection and attenuation loss of the connection between the corresponding one of the input ports IP1 to IP4 and the corresponding one of the fibers DF1/1 to DF1/4. It would of course be desirable for the technician to minimize this reflection and attenuation, e.g. by properly cleaning the connectors, before measurements are undertaken at the Distribution Box (DB1) end of the cable DFC1.

Some connectors, e.g. APC connectors, produce such low losses that the event generated by the connector is difficult to identify. In the signature-applying means EB shown in FIG. 2, the event features E1", E2", E3" and E4" all are the same predefined effective optical distance from the input ports IP1, IP2, IP3 and IP4, respectively, and serve as reference event features. Consequently, once the event corresponding to one of the reference event features E1", E2", E3" and E4" has been located in the corresponding OTDR trace, the position of the connector event corresponding to the respective one of the input ports IP1 to IP4 can be determined and the trace examined closely to determine loss, for example. It should be noted that, when the additional ports OP1, . . . , OP4 are used with the local OTDR, as monitoring ports, each is in turn connected to the OTDR launch fiber. Hence, the amplitudes of the reflections from E1" to E4" are reduced as compared with the case where the connector is left open, as when using the signature-applying means EB for OTDR testing from the terminal drop box end, but are nevertheless clearly visible, since APC-type connectors are not used.

It should be appreciated that it would be possible to make the lengths L1', L2', L3' and L4' of termination fiber sections R1', R2', R3' and R4' (see FIGS. 2 and 3) equal to each other so that each of the event features E1', E2', E3' and E4' would be the same predefined effective optical distance from the corresponding one of the input ports IP1 to IP4 and serve as a reference event feature. As before, the fiber sections R1", R2", R3" and R4" would have differing lengths δ1, δ2, δ3 and δ4. The positions of the input ports would then be determined with reference to the reference events corresponding to the event features E1', E2', E3' and E4'. As discussed hereinbefore, however, no events are caused by the event features E1' to E4' when the light is launched "backwards" into the signature-applying means EB using the configuration shown in FIG. 3. It should be noted that, when light is launched "backwards" in this way, the ability to identify the location of a very low loss connector would usually be compromised.

It should also be appreciated that the event features E1", E2", E3" and E4" could be distinct from the event features caused by the open connectors on the additional ports OP1 to OP4. For example, event features E1", E2", E3" and E4" could be separate reflectors spaced from the additional ports by more than the resolution of the OTDR.

The signature-applying means may take various forms. For example, a reflectance might be provided by a mirror reflector, as described above, a reflective Bragg grating, and so on. Alternatively, the signature-applying means might each comprise a localized loss generator, such as a lossy fusion splice or a high attenuation piece of fiber. It would also be possible to use a combination of loss and reflectance.

It is also possible to use a characteristic of each event feature (such as its reflectance value) to produce at least one of the two events (e.g. OTDR peak position and amplitude) which uniquely identify each of the termination fibers; in that case, only one event feature would be needed for each distribution fiber or termination fiber path, and the distances L1' to L4' would be the same.

Figure 4:
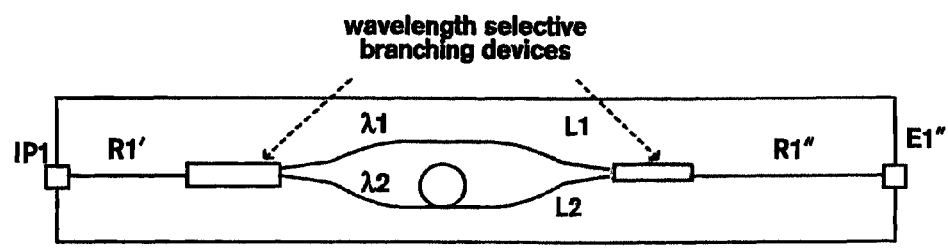
FIG. 4 illustrates the use of wavelength-selective branching devices and fibers of different lengths to generate spaced events.

It is also envisaged that the signature-applying means EB could use optical elements that behave differently at two (or more) test wavelengths, as illustrated in FIG. 4 which shows signature-applying means in the form of a pair of splitters, one used as a combiner, interposed between the termination fibers R1' and R1". Two parallel branch paths (fibers) interconnect the ports of the two splitters. The two branch paths L1, L2 have different lengths and the splitters split the light according to wavelength, namely λ1 and λ2. The difference in the effective optical length to the reference event of the path between the two wavelengths would vary from one fiber path to the next, so the difference could be used to uniquely identify each termination fiber. However, the effective optical path length from any input port to its corresponding reference event for one wavelength, λ1 for example, would be constant for all optical paths within the signature-applying means EB.

The use of wavelength selective devices could also be combined with internal events E1', E2', E3' and E4'. For example, the path lengths L1' to L4', to event features E1' to E4', could be used to provide the constant length and the paths for X2 could be used to uniquely identify each fiber in the signature-applying means EB with a specific reflectance, loss or combination of reflectance and loss.

Figure 5:
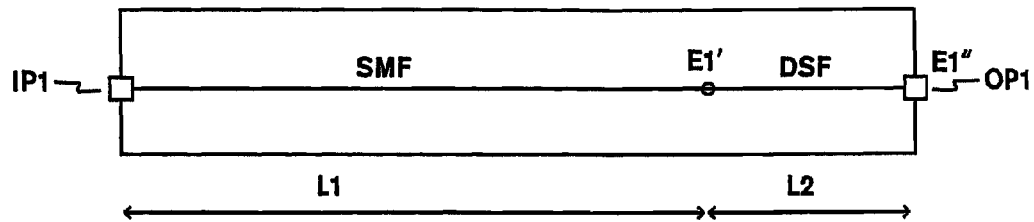
FIG. 5 illustrates the use of lengths of different kinds of fiber, in series, to create the events.

FIG. 5 illustrates another alternative implementation enabling identification of each fiber, or the port of the signature-applying means (e.g., EB) to which it is connected. It is well known that a connection between two fibers having different backscatter ratios will exhibit an event, e.g., a loss or a gain, when tested with an OTDR. This approach is very similar to encoding with splice loss except for the physical origin of the event signature.

For example, as illustrated in FIG. 5, a two-section optical path comprising a single mode fiber (SMF) section followed by a dispersion-shifted fiber (DSF) section could be used instead of fiber sections being constituted of the same fiber kind, with localized losses or reflectances, illustrated in FIGS. 2 and 3. The embodiment of FIG. 5 uses a combination of concatenated fiber sections SMF of length L1, and DSF of length L2 that exhibit different Rayleigh backscatter ratios. A detectable event will be created corresponding to the point of connection (e.g. fusion splice) between the two fiber types. The concatenated fibers sections are shown connected between the input port IP1 and monitoring port OP1. Similar concatenated fiber sections would be connected between the other input ports and the respective monitoring ports.

The relative lengths of the two sections would be different for each input port, providing the required different signatures to enable the user to identify the different input ports to which the distribution fibers are connected.

The total length of the two sections would be kept constant in order to provide a detectable feature that is localized at a known distance from the event feature E" at the monitoring port OP1.

Automated Application

A plurality of signature-applying means embodying the present invention allow reliable and efficient identification of fibers within a cable that contains many fibers, facilitating subsequent characterization of the fibers, if desired. In order to reduce the time required to perform the cable characterization and also to reduce the complexity for the operator doing the test, it is highly desirable to automate this application.

Since the identification of each termination fiber is performed with an internal event, the overall length can be maintained constant for all termination fibers. This is advantageous because having a constant and known length for all termination fibers allows the use of a more robust algorithm to evaluate the quality of the initial connection of the signature-applying means (e.g., EB) to the fiber-under-test. Since the OTDR can be programmed to look at a precise position in the trace to validate the connection, it can be done automatically. In other words, it removes the need for the user to interpret the OTDR trace in order to determine not only where the initial connection is, but also how good the connection is.

In addition, having a constant and known length for all optical paths in the signature-applying means EB, or between a particular event feature and the associated input port in the signature-applying means EB, allows the OTDR to automatically remove the contribution of the fiber paths in the signature-applying means EB from the fiber-under-test loss measurement. Advantageously, it can be done without any intervention or interpretation from the operator since the length that has to be removed is always the same. Also, having a constant and known length for all optical paths in the signature-applying means EB allows the OTDR to detect, via a measurement taken from each of the additional ports OP1 to OP4, each connection between each FUT and the corresponding input port of the signature-applying means EB, thereby permitting the technician to clean or repair the corresponding connection before undertaking measurements from the Distribution Box DB1 at the opposite end of the FUT.

Identification of a particular termination fiber from its signature may be carried out by comparing the location of trace events arising from the signature-applying means EB with a predetermined look-up table stored in the OTDR unit. This look-up table will contain trace event locations corresponding to each of the N ports of the signature-applying unit EB.

INDUSTRIAL APPLICABILITY

An advantage of embodiments of the present invention is that they are capable of providing:
1. an OTDR signature that allows the identification of which termination fiber is connected to a fiber-under-test;
2. a way to identify the location of the end of the fiber-under-test even when the connection is not detectable by the OTDR;
3. a way to validate the quality of the connection between the event feature box EB and the FUT at the time that the connection is made;
4. a straightforward way to automate the OTDR software analysis algorithms to identify unambiguously which fiber is connected to a particular port of the event feature box.

The entire contents of the various patents, patent applications and other documents referred to hereinbefore are incorporated herein by reference.

Although embodiments of the invention have been described and illustrated in detail, it is to be clearly understood that the same are by way of illustration and example only and not to be taken by way of the limitation, the scope of the present invention being limited only by the appended claims.

The invention claimed is:

1. A method of using an optical time domain reflectometer (OTDR) and signature-applying means (EB) to identify each of a plurality of fibers each having first and second ends, the signature-applying means comprising a plurality of input ports (IP1, . . . , IP4) for connection to the plurality of fibers (DF1, . . . , DF4), respectively, and a plurality of event feature means (E1', . . . E4'; E1", . . . , E4") connected to said plurality of input ports for producing, in OTDR traces for fibers connected to said input ports, respectively, a corresponding plurality of unique signatures, each unique signature comprising at least two events (4, 5), said at least two events being distinguishable from any event (3) in that OTDR trace attributable to the corresponding input port,
   one of said at least two events comprising a reference event (5) that is a predetermined reference effective optical distance from its corresponding input port,
   said reference effective optical distance being substantially the same for all of the plurality of signatures,
the method comprising the steps of:
   connecting the second end of each of the plurality of fibers (DF1, . . . , DF4) to a respective one of said plurality of input ports (IP1, . . . , IP4) of the signature-applying means (EB);
   using the OTDR, launching light into the first end of each of the fibers and obtaining at least one OTDR trace for each fiber comprising a respective unique signature including said reference event, and
   identifying each of the fibers by detecting the said at least two events of the respective unique signature.

2. A method according to claim 1, wherein each unique signature comprises first and second reference events of the OTDR trace common to each signature, and at least one event between first and second reference events, said at least one event being different for each unique signature.

3. A method according to claim 1, wherein each of said unique signatures is applied to a respective one of the said traces by generating at least two backscatter events spaced apart from each other by a predefined effective optical distance that is different from corresponding predefined effective optical distances between corresponding at least two backscatter events of the signatures of others of said traces.

4. A method according to claim 1, wherein each of the signatures is applied to a respective one of the said traces by amplitude modulation generating at least two backscatter events spaced apart from each other by a predefined effective optical distance that is different from a corresponding predefined effective optical distance between at least two backscatter events of each of the signatures of others of said traces.

5. A method according to claim 1, further comprising the step of identifying a part of the OTDR trace corresponding to said input port to check a quality of the connection between the input port and said second end of the fiber to be identified.

6. A method according to claim 1, wherein the signature-applying means comprises a plurality of additional ports (OP1, . . . , OP4) each in optical continuity with a respective one of said plurality of input ports, each additional port, when open, generating a reflective event as said reference event in the corresponding OTDR trace.

7. A method according to claim 1, wherein said signature-applying means comprises a plurality of additional ports (OP1, . . . , OP4) each in optical continuity with a respective one of said plurality of input ports, and the method further comprises a preceding step of launching light into one of said additional ports by means of an OTDR connected locally thereto, obtaining a validation OTDR trace from said one of said additional ports and from said validation OTDR trace validating a quality of the connection between the corresponding input port and fiber connected thereto.

8. A method according to claim 1, wherein said step of launching light comprises launching light at a first wavelength ($\lambda 1$) and a second wavelength ($\lambda 2$) and said at least one OTDR trace comprises a first OTDR trace corresponding to said first wavelength and a second OTDR trace corresponding to said second wavelength, said two events each appearing in a respective one of said first and second OTDR traces.

9. A method according to claim 1, wherein each of the said at least two events is detectable by at least one of its position, its amplitude, and a wavelength at which it is detectable.

10. A method according to claim 1, wherein each signature is applied to a respective one of the traces by amplitude modulation of backscattered light, such that an amplitude of a resulting event in the OTDR trace differs from one signature to another.

11. A method according to claim 10, wherein the amplitude modulation is provided by producing a predetermined change in value of one or a combination of loss, gain, and reflectance.

12. A method according to claim 11, wherein said predetermined change in value is wavelength dependent.

13. Signature-applying means (EB) for use with an optical time domain reflectometer (OTDR) in identifying each of a plurality of fibers (DF1/1, ..., DF2/4), the OTDR being connected in use to respective first ends of the plurality of fibers for launching light into said first end of each of the fibers in turn and obtaining at least one corresponding OTDR trace therefrom,
said signature-applying means (EB having a plurality of input ports (IP1, ..., IP4) for connection to respective second ends of the fibers, and
a plurality of event feature means for producing in each OTDR trace a corresponding unique signature, each signature comprising at least two events distinct from any event generated by a respective one of said input ports, each of the said at least two events being detectable by at least one of its position, its amplitude, and a wavelength at which it is detected, each of the fibers being identifiable by detecting the said at least two events of the respective unique signature in the at least one OTDR trace corresponding to said respective signature-applying means,
each event feature means comprising a reference event feature at a predetermined reference effective optical distance from the corresponding input port for producing a corresponding reference event in a corresponding signature.

14. Signature-applying means according to claim 13, wherein each event feature means comprises at least two backscatter event features spaced apart from each other by a predefined effective optical distance that is different from corresponding predefined effective optical distances between the at least two backscatter event features of the event feature means for generating other signatures.

15. Signature-applying means according to claim 13, wherein event feature means comprises at least one of a reflector, a reflective surface at a splitter/coupler port, a single reflective Bragg grating and a single attenuator.

16. Signature-applying means according to claim 13, wherein event feature means comprises two pairs of mating connectors.

17. Signature-applying means according to claim 13, wherein the event feature means apply first and second reference events which are substantially the same in each signature and at least one event between the first and second reference events, which is different in each unique signature.

18. Signature applying means according to claim 13, wherein the predetermined reference effective optical distance is the same for each of the plurality of reference event features relative to its respective one of said plurality of input ports.

19. Signature-applying means according to claim 13, wherein each of said plurality of event feature means is arranged to apply the signature for a respective trace by amplitude modulation of backscattered light, such that an amplitude of a resulting event differs from one signature to another.

20. Signature-applying means according to claim 13, wherein event feature means comprises a combination of reflective and attenuating elements.

21. Signature-applying means according to claim 13, wherein the event feature means comprises means for applying to each trace information enabling a part of an OTDR trace corresponding to a connection between said second end of a fiber and a respective input port of the signature-applying means to be identified regardless of whether or not the connection between the fiber and said respective input port exhibits a reflectance or loss within a measuring capability of the OTDR.

22. Signature-applying means according to claim 19, wherein the event feature means comprises means (C1, E1', ..., C4, E4') for providing a predetermined value of a loss or attenuation to effect the amplitude modulation.

23. Signature-applying means according to claim 21, wherein said event feature means comprises at least one splitter, one arm of the splitter being terminated with a reflective surface (E1', ..., E4') at an optical distance from the splitter less than a spatial resolution of the OTDR, the splitter providing attenuation and the reflective surface providing reflectance.

24. Signature-applying means according to claim 21, wherein the information comprises reference events generated by a plurality of reference event features spaced from respective ones of a corresponding plurality of input ports to which the fibers will be connected, the reference event features being spaced from respective ones of the input ports (IP1, ..., IP4) by a predetermined reference effective optical distance, enabling said part of the corresponding trace to be determined by reference to one of said reference events and a corresponding predetermined effective optical distance.

25. Signature-applying means according to claim 24, wherein said plurality of reference event features are spaced from said plurality of input ports, respectively, by the same reference effective optical distance.

26. A method of using an optical time domain reflectometer (OTDR) and signature-applying means (EB) to identify each of a plurality of fibers each having first and second ends, the signature-applying means comprising a plurality of input ports (IP1, ..., IP4) for connection to the plurality of fibers (DF1, DF4), respectively, and event feature means (E E4'; E1", ..., E4") connected to said plurality of input ports for producing in OTDR traces for fibers connected to said input ports, respectively, a corresponding plurality of unique signatures,
said signature-applying means further comprising a plurality of additional ports (OP1, ..., OP4) each in optical continuity with and a known effective optical distance from a respective one of said plurality of input ports,
the method comprising the steps of:
(i) validating a quality of a connection between at least one of the plurality of input ports and a respective fiber connected thereto, the quality validation comprising launching light into a corresponding one of said additional ports by means of the OTDR connected locally thereto, obtaining a validation OTDR trace from said one of said additional ports and determining said quality from said validation OTDR trace;
(ii) connecting a second end of each of the plurality of fibers (DF1, ..., DF4) to a respective one of said plurality of input ports (IP1, ..., IP4) of the signature-applying means (EB);
(iii) using the OTDR, launching light into a first end of each of the fibers and obtaining at least one OTDR trace for each fiber comprising a respective unique signature and identifying said fiber therefrom.

27. Signature-applying means for use with an optical time domain reflectometer (OTDR) to identify each of a plurality of fibers, the signature-applying means (EB) comprising a plurality of input ports (IP1, ..., IP4), a plurality of additional ports each connected to a respective one of the input ports, and a plurality of event feature means each connected to a respective one of said input ports, each event feature means producing in OTDR traces of a fiber connected to a corresponding one of said input ports a respective one of a plurality of unique signatures, each signature comprising at least two events in a corresponding OTDR trace, one of said two events being generated by a respective open one of said additional ports.

* * * * *

UNITED STATES PATENT AND TRADEMARK OFFICE
CERTIFICATE OF CORRECTION

PATENT NO. : 8,482,725 B2
APPLICATION NO. : 12/081985
DATED : July 9, 2013
INVENTOR(S) : Stéphane Perron et al.

Page 1 of 1

It is certified that error appears in the above-identified patent and that said Letters Patent is hereby corrected as shown below:

In the specification:

In column 2, line 20, the word "minor" should read --mirror--.

In column 8, lines 29, 35 and 39, the word "minor" should read --mirror--.

In column 10, line 17, "X2" should read --$\lambda 2$--.

In the claims:

In column 13, claim 13, line 13, "(EB" should be replaced by --(EB)--.

In column 14, claim 23, line 11, "21" should be replaced by --20--;
    claim 26, line 37, "DF1, DF4" should be replaced by --DF1, …, DF4--, and
    "E E4'" should be replaced by --E1', …, E4'--.

Signed and Sealed this
First Day of October, 2013

Teresa Stanek Rea
*Deputy Director of the United States Patent and Trademark Office*